US009883471B2

(12) United States Patent
Zhang

(10) Patent No.: US 9,883,471 B2
(45) Date of Patent: Jan. 30, 2018

(54) METHOD AND DEVICE FOR RATE MATCHING

(75) Inventor: Jinping Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 586 days.

(21) Appl. No.: 14/117,126

(22) PCT Filed: Jun. 13, 2011

(86) PCT No.: PCT/CN2011/000973
§ 371 (c)(1),
(2), (4) Date: Nov. 12, 2013

(87) PCT Pub. No.: WO2012/171133
PCT Pub. Date: Dec. 20, 2012

(65) Prior Publication Data
US 2014/0192796 A1 Jul. 10, 2014

(51) Int. Cl.
*H04W 56/00* (2009.01)
*H04W 28/02* (2009.01)
(Continued)

(52) U.S. Cl.
CPC ..... *H04W 56/001* (2013.01); *H04W 28/0205* (2013.01); *H04W 88/085* (2013.01); *H04W 92/12* (2013.01)

(58) Field of Classification Search
None
See application file for complete search history.

(56) References Cited

U.S. PATENT DOCUMENTS 7,646,751 B2 * 1/2010 Osterling .............. H04W 88/08 370/320
8,270,321 B1 * 9/2012 Zhang ................... H04W 28/06 370/280
(Continued)

FOREIGN PATENT DOCUMENTS

CN 1860811 A 11/2006
CN 101282349 A * 10/2008
(Continued)

OTHER PUBLICATIONS

Common Public Interface, "Common Public Radio Interface (CPRI); Interface Specification", CPRI Specification □ V4.2, Sep. 29, 2010, pp. 1-113, CPRI, retrieved from internet: http://www.cpri.info/spec.html.*
(Continued)

*Primary Examiner* — Charles C Jiang
*Assistant Examiner* — Kyaw Z Soe
(74) *Attorney, Agent, or Firm* — Coats & Bennett, PLLC

(57) ABSTRACT

Embodiments of this invention provide a rate matching device used for exchanging data between REC and at least one RE. The rate matching device comprises at least one first interface arranged to exchange user data between the REC and the rate matching device, at least one second interface arranged to exchange user data between the rate matching device and the at least one RE, and a map function block arranged to map the user data between at least one first interface and at least one second interface. Embodiments of this invention also provide a method for exchanging data between REC and at least one RE through the rate matching device.

16 Claims, 6 Drawing Sheets

(51) Int. Cl.
*H04W 92/12* (2009.01)
*H04W 88/08* (2009.01)

(56) References Cited

U.S. PATENT DOCUMENTS

| | | | | |
|---|---|---|---|---|
| 8,599,827 | B2 * | 12/2013 | Irvine | H04J 3/0632 370/350 |
| 8,830,968 | B2 * | 9/2014 | Lin | H04W 28/06 370/336 |
| 2005/0107124 | A1 | 5/2005 | Osterling et al. | |
| 2006/0045020 | A1 * | 3/2006 | Picco | H04J 3/0682 370/249 |
| 2011/0032910 | A1 * | 2/2011 | Aarflot | H04J 3/0682 370/335 |
| 2011/0116440 | A1 * | 5/2011 | Shimada | H04B 7/155 370/315 |
| 2011/0243071 | A1 * | 10/2011 | Wu | H04W 88/085 370/328 |
| 2012/0057572 | A1 * | 3/2012 | Evans | H04W 88/085 370/338 |
| 2012/0307712 | A1 * | 12/2012 | Watanabe | H04B 7/2606 370/315 |
| 2013/0003677 | A1 * | 1/2013 | Yu | H04W 88/085 370/329 |
| 2013/0077603 | A1 * | 3/2013 | Lin | H04W 72/0446 370/336 |
| 2013/0121240 | A1 * | 5/2013 | Przada | H04J 3/0682 370/328 |

FOREIGN PATENT DOCUMENTS

| | | | |
|---|---|---|---|
| CN | 101860394 | A | 10/2010 |
| WO | 2010069241 | A1 | 6/2010 |

OTHER PUBLICATIONS

Common Public Interface, "Common Public Radio Interface (CPRI); Interface Specification", CPRI Specification V4.2, Sep. 29, 2010, pp. 1-113, CPRI, retrieved from internet: http://www.cpri.info/spec.html.

Common Public Interface, "Common Public Radio Interface (CPRI); Interface Specification", CPRI Specification V5.0, Sep. 21, 2011, pp. 1-119, CPRI, retrieved from internet: http://www.cpri.info/spec.html.

Altera Corporation, "An 610: Implementing Deterministic Latency for CPRI and OBSAI Protocols in Altera Devices", Jul. 1, 2010, pp. 1-18, retrieved on Nov. 4, 2014, retrieved from internet: www.altera.com/literature/an/an610.pdf.

Dannhardt, M. "Ethernet over SONET Technology White Paper." Feb. 2002. 19 pages. PMC-Sierra, Inc. Burnaby, BC, Canada.

* cited by examiner 4.9152G CPRI Frame

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | #Z.X.0 | AXC0 | AXC0 | AXC2 | AXC2 | AXC4 | AXC4 | AXC6 | AXC6 | AXC8 | AXC8 | | | | | |
| 1 | #Z.X.1 | AXC0 | AXC0 | AXC2 | AXC2 | AXC4 | AXC4 | AXC6 | AXC6 | AXC8 | AXC8 | | | | | |
| 2 | #Z.X.2 | AXC0 | AXC0 | AXC2 | AXC2 | AXC4 | AXC4 | AXC6 | AXC6 | AXC8 | AXC8 | | | | | |
| 3 | #Z.X.3 | AXC0 | AXC0 | AXC2 | AXC2 | AXC4 | AXC4 | AXC6 | AXC6 | AXC8 | AXC8 | | | | | |
| 4 | #Z.X.4 | AXC1 | AXC1 | AXC3 | AXC3 | AXC5 | AXC5 | AXC7 | AXC7 | AXC9 | AXC9 | | | | | |
| 5 | #Z.X.5 | AXC1 | AXC1 | AXC3 | AXC3 | AXC5 | AXC5 | AXC7 | AXC7 | AXC9 | AXC9 | | | | | |
| 6 | #Z.X.6 | AXC1 | AXC1 | AXC3 | AXC3 | AXC5 | AXC5 | AXC7 | AXC7 | AXC9 | AXC9 | | | | | |
| 7 | #Z.X.7 | AXC1 | AXC1 | AXC3 | AXC3 | AXC5 | AXC5 | AXC7 | AXC7 | AXC9 | AXC9 | | | | | |

Fig 4

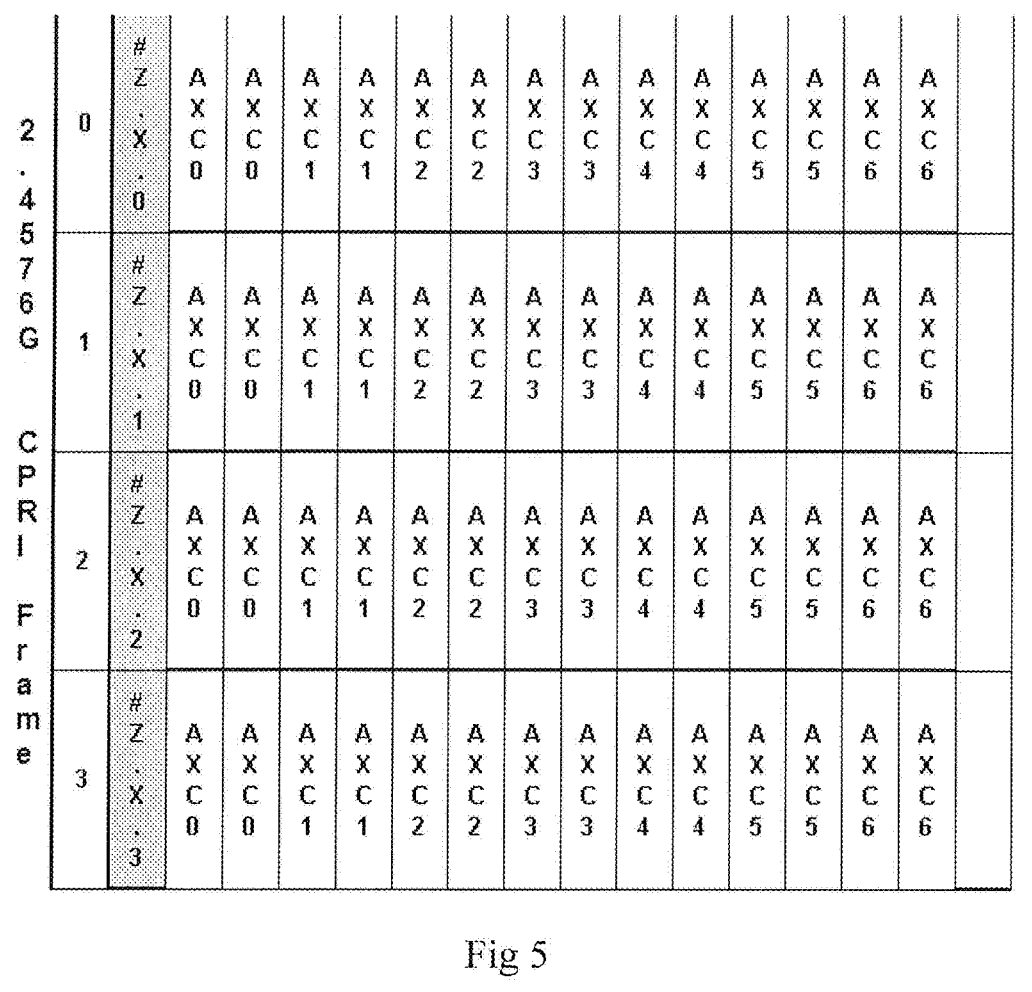

2.4576G CPRI Frame

| | | | | | | | | | | | | | | | | |
|---|---|---|---|---|---|---|---|---|---|---|---|---|---|---|---|---|
| 0 | #Z.X.0 | AXC0 | AXC0 | AXC1 | AXC1 | AXC2 | AXC2 | AXC3 | AXC3 | AXC4 | AXC4 | AXC5 | AXC5 | AXC6 | AXC6 | |
| 1 | #Z.X.1 | AXC0 | AXC0 | AXC1 | AXC1 | AXC2 | AXC2 | AXC3 | AXC3 | AXC4 | AXC4 | AXC5 | AXC5 | AXC6 | AXC6 | |
| 2 | #Z.X.2 | AXC0 | AXC0 | AXC1 | AXC1 | AXC2 | AXC2 | AXC3 | AXC3 | AXC4 | AXC4 | AXC5 | AXC5 | AXC6 | AXC6 | |
| 3 | #Z.X.3 | AXC0 | AXC0 | AXC1 | AXC1 | AXC2 | AXC2 | AXC3 | AXC3 | AXC4 | AXC4 | AXC5 | AXC5 | AXC6 | AXC6 | |

Fig 5

| 2.4576G CPRI Frame | 0 | #Z.X.0 | AxC7 | AxC7 | AxC8 | AxC8 | AxC9 | AxC9 | | | | | | | |
|---|---|---|---|---|---|---|---|---|---|---|---|---|---|---|---|
| | 1 | #Z.X.1 | AxC7 | AxC7 | AxC8 | AxC8 | AxC9 | AxC9 | | | | | | | |
| | 2 | #Z.X.2 | AxC7 | AxC7 | AxC8 | AxC8 | AxC9 | AxC9 | | | | | | | |
| | 3 | #Z.X.3 | AxC7 | AxC7 | AxC8 | AxC8 | AxC9 | AxC9 | | | | | | | |

METHOD AND DEVICE FOR RATE MATCHING

TECHNICAL FIELD

This invention generally relates to a method and a device for rate matching.

BACKGROUND

Base stations with structure of Radio Equipment Control node (REC) and Radio Equipment node (RE) has been widely used in wireless systems. An organization named Common Public Radio Interface (CPRI) defined specifications (such as V4.2) for key internal interfaces between REC and RE.

REC usually contains radio function of digital baseband domain, and is usually related to network interface transport, radio base station control and management, as well as digital baseband processing. RE usually provides analogue and radio frequency functions, such as filtering, modulation, frequency conversion and amplification.

According to the specifications of CPRI, several types of line bit rate are available in order to achieve the required flexibility and cost efficiency: 614.4 Mbit/s, 1228.8 Mbit/s, 2457.6 Mbit/s, 3072.0 Mbit/s, 4915.2 Mbit/s, 6144.0 Mbit/s, and 9830.4 Mbit/s. Other line bit rates may be available in the future.

In current network topology, REC usually connects to RE which supports the same line bit rate as REC. Because the CPRI specifications can provide seven types of line bit rate and require that each REC and RE support at least one of the seven types of line bit rate, it will be a long term that REC and RE with different CPRI line bit rate exist in the radio system or wireless system at the same time and it is inescapable that REC connect to RE with different line bit rate. According to current solutions, when REC connects to RE with different line bit rate, they will work under lower line bit rate of both.

For example, as indicated in FIG. 1, when REC with 4915.2 Mbit/s line bit rate connects to RE with 2457.6 Mbit/s line bit rate, REC and RE will work under the 2457.6 Mbit/s line bit rate and REC will waste half of highest physical channel processing capability and part of baseband processing capability. In another example, when REC with 2457.6 Mbit/s line bit rate connect to RE with 4915.2 Mbit/s line bite rate, REC and RE will work under the 2457.6 Mbit/s line bit rate and RE will waste half of highest physical channel processing capability and carrier processing capability.

Thus, the problem is, when REC connect to RE with different line bit rate, REC and RE will work under the lower line bit rate and either REC or RE can not work with its highest processing capability and result in the waste of cost and efficiency.

SUMMARY OF THE INVENTION

It is the object of this invention to obviate the above problem or improve the situation.

One aspect of this invention includes a rate matching device. This device is used for exchanging data between REC and RE. This device comprises one or more first interfaces, one or more second interfaces and a map function block. The first interface is used to exchange user data between the REC and the rate matching device, and the second interface is used to exchange user data between the rate matching device and at least one RE. The map function block is used to map the user data between one or more first interfaces one or more second interfaces.

Another aspect of this invention provides a method for exchanging data between REC and RE through a rate matching device. The method includes receiving user data from REC via one or more first interfaces of the rate matching device, mapping the user data from one or more first interfaces into one or more second interfaces of the rate matching device, and transmitting the user data to RE via one or more second interfaces.

There also provides a computer program product adapted to carryout the method as described above when run on a computer. There also provides a computer readable medium comprising computer executable program code adapted to carry out the steps in the method as described above.

BRIEF DESCRIPTION OF THE DRAWINGS

FIG. 4 shows an example of structure of data before distribution according to embodiments.

FIG. 5 and FIG. 6 show examples of structure of data after distribution according to embodiments.

DETAILED DESCRIPTION

Figure 1:
FIG. 1 shows a schematic topology for exchanging data between REC and RE in prior art.

While the invention covers various modifications and alternative constructions, embodiments of the invention are shown in the drawings and will hereinafter be described in detail. However it should be understood that the specific description and drawings are not intended to limit the invention to the specific forms disclosed. On the contrary, it is intended that the scope of the claimed invention includes all modifications and alternative constructions thereof falling within the scope of the invention as expressed in the appended claims.

Unless otherwise defined in the context of this description, all technical and scientific terms used herein have the same meaning as commonly understood by one of ordinary skill in the art to which this invention belongs.

The methods and arrangement, as shown in the following drawings, can be used in a variety of computing system, e.g., including but not limited to server, personal computer, laptop computer, embedded computer and like. Moreover, the methods can be implemented in form of software, hardware, firmware or the combination thereof.

Figure 2:
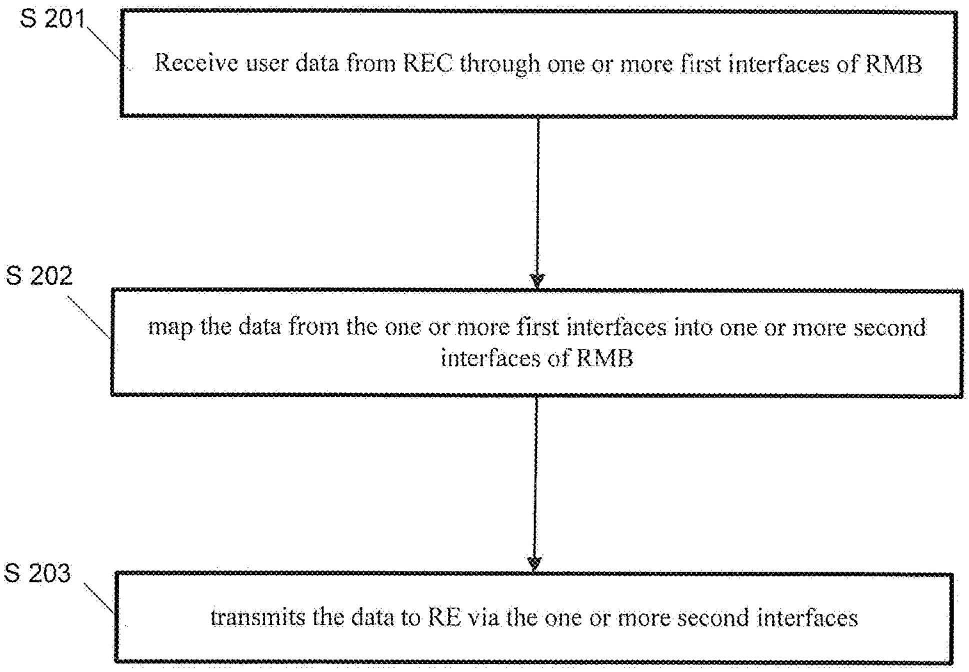
FIG. 2 is a flowchart illustrating the process exchanging data between REC and RE according to embodiments.

FIG. 2 shows the schematic process of the method for exchanging data between REC and RE through a rate matching device/Box (RMB). RMB can include three or more interfaces, and any of these interfaces can be used for exchanging data between REC and RMB, or exchanging data between RMB and RE. The data exchange between REC and RMB can be receiving data from REC or transmitting data to REC. The data exchange between RMB and RE can be transmitting data to RE or receiving data from RE. We can call the interface(s) used for exchanging data between REC and RMB the first interface(s), and call the interface(s) used for exchanging data between RMB and RE as second interface(s).

In Step 201, RMB receives user data from REC via one or more first interfaces.

In Step 202, RMB maps the data from one or more first interfaces, or at least one first interface, into one or more second interfaces, or at least one second interface. Take the topologies of one REC and one RE for example, RMB distribute s the data from one first interface into two or more parts and transmit them via two or more second interfaces, or merge the data from two or more first interfaces into one and transmit it via one second interface.

In Step 203, RMB transmits the data to RE via the one or more second interfaces.

It should be noted that RMB can transfer data between one or more REC and one or more RE. These RECs or REs may have the same line bit rate or different line bit rates.

Number of first interfaces and number of second interfaces used in the data exchange can be determined based on the relationship between line rates of one or more REC and those of one or more RE. For example, the numbers of the first interface and the second interface can be determined as follows:

Both the sum of line bit rates of all the one or more first interfaces and the sum of line bit rates of all the one or more second interfaces are no greater than the bigger one of the line bit rates between REC(s) and RE(s). Take one REC with line bit rate R1 connected to one RE with line bit rate R2 as an example. If R1 is bigger than R2, there can be one first interface and two or more second interfaces. The specific number of second interfaces can be determined based on the ratio of R1 and R2. If R2 is bigger than R1, there can be two or more first interfaces and one second interface. The specific number of first interfaces can be determined based on the ratio of R1 and R2. In another example, REC with line bite rate R1 connected to RE1 with line bit rate R2 and RE2 with line bit rate R3 and R1 is equal to the sum of R2 and R3. R1 is bigger than R2 and R3, so there can be one first interface and two second interfaces.

During the process of user data exchange between REC and RE, control information may be exchanged via RMB. The control information may include synchronization information, Layer one inband protocol data and Control & Management data. The control information may also include protocol extension information and vendor specific information. There can be several ways for transferring control information between REC and RMB, or between RMB and RE. The control information may include one or more control words which are used to indicate which way will be used to transfer the control information. Preferably, the one or more control words are included in the Layer one inband protocol data.

One way is to transmit the control information via two or more first interfaces between REC and RMB or via two or more second interfaces between RMB and RE, where each of first interfaces or second interfaces carries the same control information, and one is the backup of the rests.

The second way is to transfer the control information via either one of first interfaces between REC and RMB or second interfaces between RMB and RE. The third way is to distribute the control information into two or more first interfaces or second interfaces.

The process of uplink transmission is similar to that of downlink transmission described above. In the uplink transmission, RMB receives user data from RE via one or more second interfaces, and maps the data from one or more second interfaces into one or more first interfaces. And then RMB transmits the data to REC via one or more first interfaces. Where there is one first interface and two or more second interfaces, RMB merges the uplink data from second interfaces into the first interface. Where there are two or more first interfaces and one second interface, RMB distributes the uplink data from the second interface into the first interfaces.

To meet the requirements of RE timing in some situations, a system clock signal can be generated for RMB and a reference clock signal, such as a Phase-Locked Loop clock signal, can be generated for RE based on a clock signal coming from anyone of the first interfaces. This can be executed by RMB, such as a clock unit in RMB.

Because of the introduction of RMB, the method for calculation of link delay compensation may be different from the prior art. For more precise delay calculation for link delay compensation, a delay can be calculated in RMB, such as in a delay calculation unit in RMB. This delay indicates the time delay inside of RMB itself, and is used to get the link delay compensation between REC and RE. There are different ways for calculating. One way is to calculate with a special data sequence and measure the downlink delay and uplink delay separately. Then RMB reports the value of downlink and uplink delay to REC as one input parameter of REC. REC updates its delay compensation value with this input parameter.

When no RMB locates on the link, the input parameter is zero and no any effect on the link delay compensation. When different configuration RMBs locates on the link, REC updates the delay compensation value with different input parameter.

Figure 3:
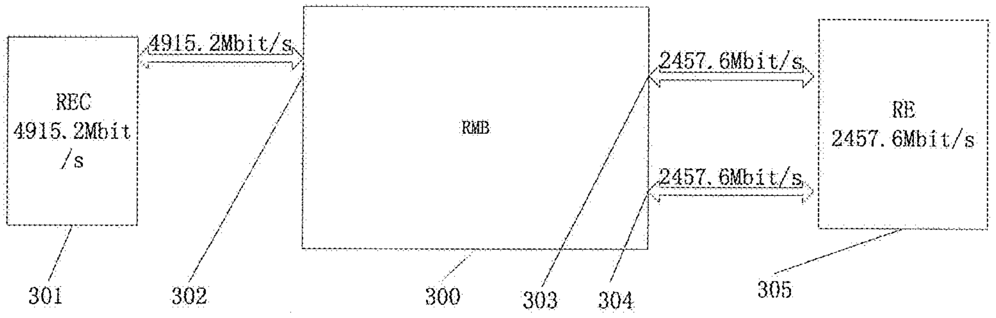
FIG. 3 shows a schematic topology for exchanging data between REC and RE according to embodiments.

FIG. 3 shows the schematic topology in one embodiment of method for exchanging data between REC and RE. In this embodiment, REC 301 has the line bit rate R1, 4915.2 Mbit/s. RE 305 has the line bit rate R2, 2457.6 Mbit/s. REC 301 connects to RE 305 through RMB 300.

Because R1 is bigger that R2, there is one first interface and two or more second interfaces, and the sum of line bit rates of all second interfaces should be no greater than R1. In this example, based on the ratio of R1 and R2, there are two second interfaces 303 and 304. REC 301 transmits user data to RMB 300 via one first interface 302, with line bit rate of 4915.2 Mbit/s. After receiving the user data from REC 301 via interfaces 302, RMB 300 maps the user data into interface 303 and 304. More specifically, RMB 300 distributes the user data from interface 302 into interface 303 and 304. Take Antenna Carrier (AXC) IQ data For example, the AXC IQ data received via interface 302 has the structure showed in FIG. 4, and RMB distributes it into interfaces 303 and 304. The data transmitted via interface 303 has the structure showed in FIG. 5, and the data transmitted via interface 304 has the structure showed in FIG. 6. Both of these two parts of data are transmitted to RE with line rate of 2457.6 Mbit/s.

In uplink transmission, RE 305 transmits uplink data to RMB via interface 303 and 304, and RMB merges the data into interface 302, and then transmits it to REC 301 via interface 302. Take the AXC IQ data For example, the AXC IQ data transmitted via interface 303 has the structure showed in FIG. 5, and the AXC IQ data transmitted via interface 304 has the structure showed in FIG. 6. Both of these two parts of data are transmitted to RMB with line rate of 2457.6 Mbit/s. RMB merges them into 302. The AXC IQ data received via interface 302 has the structure showed in FIG. 6. RMB transmits the data via interface 302 to REC 301 with line rate of 4915.2 Mbit/s.

Figure 6:
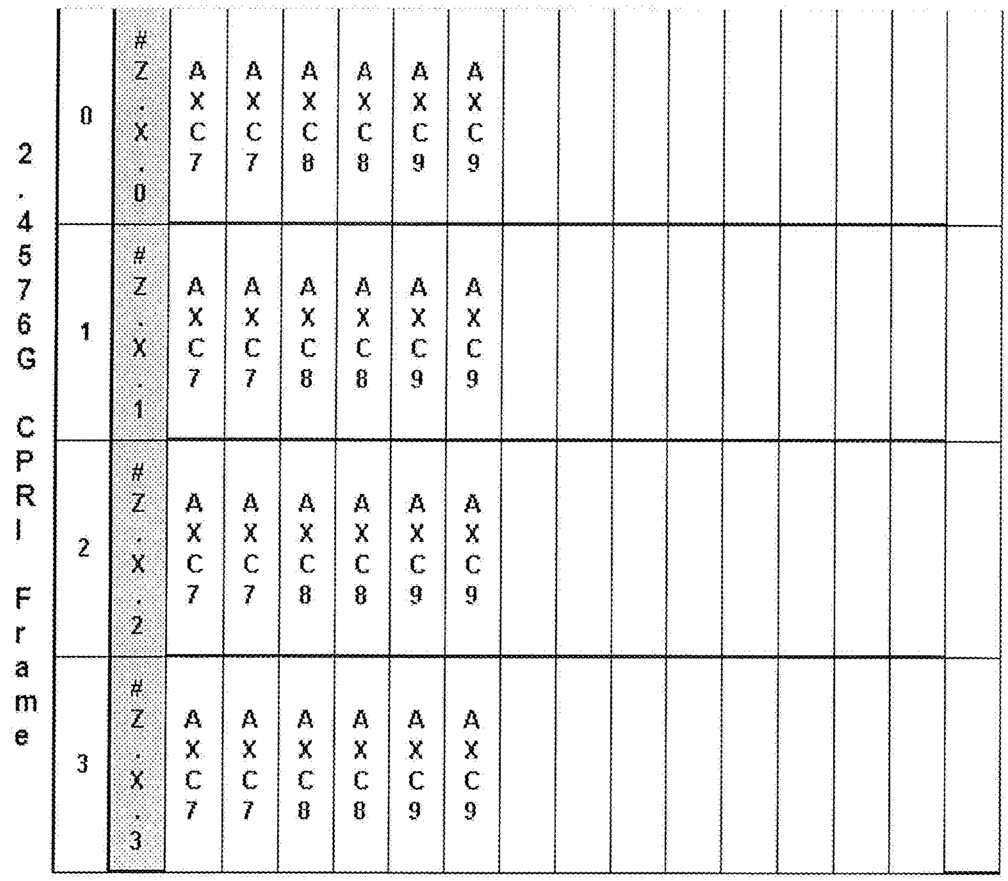

During the process of user data exchange between REC 301 and RE 305, control information may be exchanged. For example, REC 301 may transfer control information to RE 305 through RMB 300. In FIGS. 4, 5 and 6, the white part (columns 1-10) is user data and the grey part (column 0) is control information.

For example, REC 301 transmits the control information 302 through a control channel such as a slow Control & Management channel to RMB300, and then RMB 300 transmits the control information to RE 305. The line bit rate of interface 302 is 4915.2 Mbit/s and the highest High level Data Link Control (HDLC) bit rate is 3840 kbit/s. The line bit rate of interfaces 303 and 304 is 2457.6 Mbit/s and the HDLC bit rate is 1920 kbit/s. More details about slow Control & Management channel can be found in CPRI Specifications. If the 1920 kbit/s HDLC bit rate is enough for the control channel between REC 301 and RE 305, REC 301 can use the first way, that is, interface 303 and 304 transfer the same control information, and either of them will be the backup of the other. Each of control channels via interface 302, 303 and 304 will work under 1920 kbit/s. Of course, if backup is not needed, REC 301 can use the second way, that is, control information from interface 302 is transferred via interface 303 or 304.

If the 3840 kbit/s HDLC bit rate is required, the control channel via interface 302 will work under 3840 kbit/s and the control channels via interfaces 303 and 304 will work under 1920 kbit/s. In this situation, REC 301 can use the third way, that is, the control information from interface 302 can be distributed into interface 303 and 304. REC 301 can use one or more control words to inform RMB which way is used to transfer the control information and how to distribute the control information if the third way is used. For example, if interface 302 uses the following bytes to transfer the control information:

Z.1.0, Z.1.1, Z.1.2, Z.1.3, Z.1.4, Z.1.5, Z.1.6, Z.1.7, Z.65.0, Z.65.1, Z.65.2, Z.65.3, Z.65.4, Z.65.4, Z.65.5, Z.65.6, Z.65.7, Z.129.0, Z.129.1, Z.129.2, Z.129.3, Z.129.4, Z.129.5, Z.129.6, Z.129.7, Z.193.0, Z.193.1, Z.193.2, Z.193.3, Z.193.4, Z.193.5, Z.193.6, Z.193.7. Z indicates the hyper-frame number.

The control words can indicate distributing these bytes (Z.1.0, Z.1.1, Z.1.2, Z.1.3, Z.65.0, Z.65.1, Z.65.2, Z.65.3, Z.129.0, Z.129.1, Z.129.2, Z.129.3, Z.193.0, Z.193.1, Z.193.2, Z.193.3) to transfer via interface 303 and the other bytes (Z.1.4, Z.1.5, Z.1.6, Z.1.7, Z.65.4, Z.65.5, Z.65.6, Z.65.7, Z.129.4, Z.129.5, Z.129.6, Z.129.7, Z.193.4, Z.193.5, Z.193.6, Z.193.7) to transfer via interface 304. RMB, such as a map function block of RMB, distributes the bytes into interface 303 and 304, and then RE 305 will merge all of these bytes.

Figure 7:
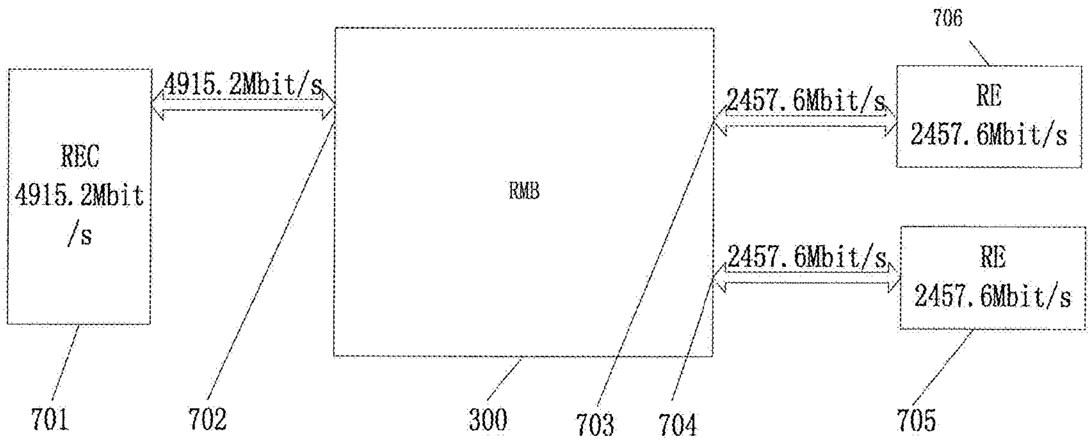
FIG. 7 shows another schematic topology for exchanging data between REC and RE according to embodiments.

FIG. 7 shows the schematic topology in another embodiment of method for exchanging data between REC and RE. In this embodiment, REC 701 has the line bit rate R1, which is 4915.2 Mbit/s. RE 705 has the line bit rate R2, which is 2457.6 Mbit/s. RE 706 has the line bit rate R3, which is 2457.6 Mbit/S. REC 701 connects to RE 705 and 706 through RMB 300. Because R1 is bigger than R2 and R3 and equal to the sum of R2 and R3, there is one first interface 702 and two second interfaces 703 and 704.

REC 701 merges the downlink user data to RE 705 and RE 706 and sends them to RMB 300. RMB 300 receives the user data via interface 702 with line bit rate of 4915.2 Mbit/s and then distributes the user data into interface 703 and 704. For example, the total 10 AXC IQ data showed in FIG. 4 was distributed into 7 AXC IQ data showed in FIGS. 5 and 3 AXC IQ data showed in FIG. 6. Then RMB 300 transmits the user data to RE 705 via interface 704 with line rate of 2457.6 Mbit/s, and transmits the user data to RE 706 via interface 703 with line rate of 2457.6 Mbit/s.

REC 701 may transfer control information to RE 705 and RE 706. The line bit rate of interface 702 is 4915.2 Mbit/s and HDLC bit rate is 3840 kbit/s. The line bit rate of interface 703 and 704 is 2457.6 Mbit/s and HDLC bit rate is 1920 kbit/s. HDLC bit rate of interface is 3840 kbit/s, so the following bytes can be used to transfer the control information:

Z.1.0, Z.1.1, Z.1.2, Z.1.3, Z.1.4, Z.1.5, Z.1.6, Z.1.7, Z.65.0, Z.65.1, Z.65.2, Z.65.3, Z.65.4, Z.65.4, Z.65.5, Z.65.6, Z.65.7, Z.129.0, Z.129.1, Z.129.2, Z.129.3, Z.129.4, Z.129.5, Z.129.6, Z.129.7, Z.193.0, Z.193.1, Z.193.2, Z.193.3, Z.193.4, Z.193.5, Z.193.6, Z.193.7.

HDLC bit rate of interface 703 and 704 is 1920 kbit/s, so the following bytes can be used to transfer the control information:

Z.1.0, Z.1.1, Z.1.2, Z.1.3, 2.65.0, Z.65.1, Z.65.2, Z.65.3, Z.129.0, Z.129.1, Z.129.2, Z.129.3, Z.193.0, Z.193.1, Z.193.2, Z.193.3.

REC 701 will transmit the control information regarding RE 705 via some bytes of interface 702, then RMB 300 extract these bytes and transmit them to RE 705 via interface 704. REC 701 will transmit the control information regarding RE 706 via the other bytes of interface 702, then RMB 300 extract these bytes and transmit them to RE 706 via interface 703. In this process, one or more control words are used to tell RMB which bytes are transmitted via interface 703 and which bytes are transmitted via interface 704.

Figure 8:
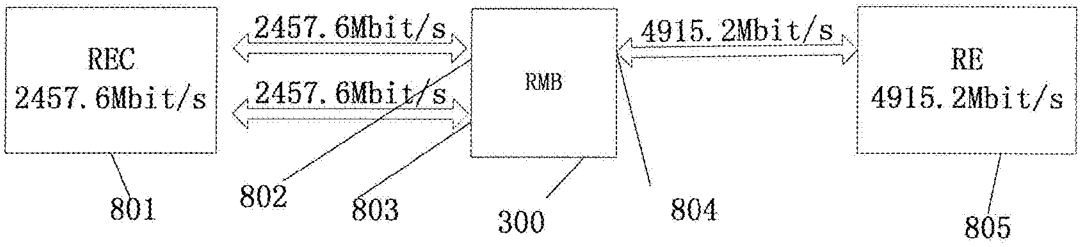
FIG. 8 shows another schematic topology for exchanging data between REC and RE according to embodiments.

FIG. 8 shows the schematic topology in another embodiment of method for exchanging data between REC and RE. In this embodiment, REC 801 has the line bit rate R1, 2457.6 Mbit/s. RE 805 has the line bit rate R2, 4915.2 Mbit/s. REC 801 connects to RE 805 through RMB 300. Because R2 is bigger than R1, there is one second interface and two or more second interfaces and the sum of line bit rates of all first interfaces should be no greater than R2. In this example, there are two first interfaces 802 and 803.

REC 801 divides the downlink user data into two parts, and sends the two parts to RMB 300 via interface 802 and 803 separately. RMB 300 receives the user data via interface 802 and 803 with line bit rate of 2457.6 Mbit/s and merges the user data into interface 804. Then RMB 300 transmits the user data to RE 805 via interface 804 with line rate of 4915.2 Mbit/s.

REC 801 may transfer control information to RE 805. If the HDLC bit rate of one channel is enough, REC 801 can transfer the control information via interface 802 and 803, where the transferred control information is same, and one is the backup of the other. REC 801 may transfer the control information via only one of interface 802 and 803. If the HDLC bit rate of one channel is not enough, REC 801 will divide the control information into two parts and transfer them via interfaces 802 and 803 to RMB 300. RMB 300 will merge them into one and transmit it via interface 804 to REC 805. In this process, one or more control words can be used to indicate which way is used and how to merge the control information when the third way is used.

Figure 9:
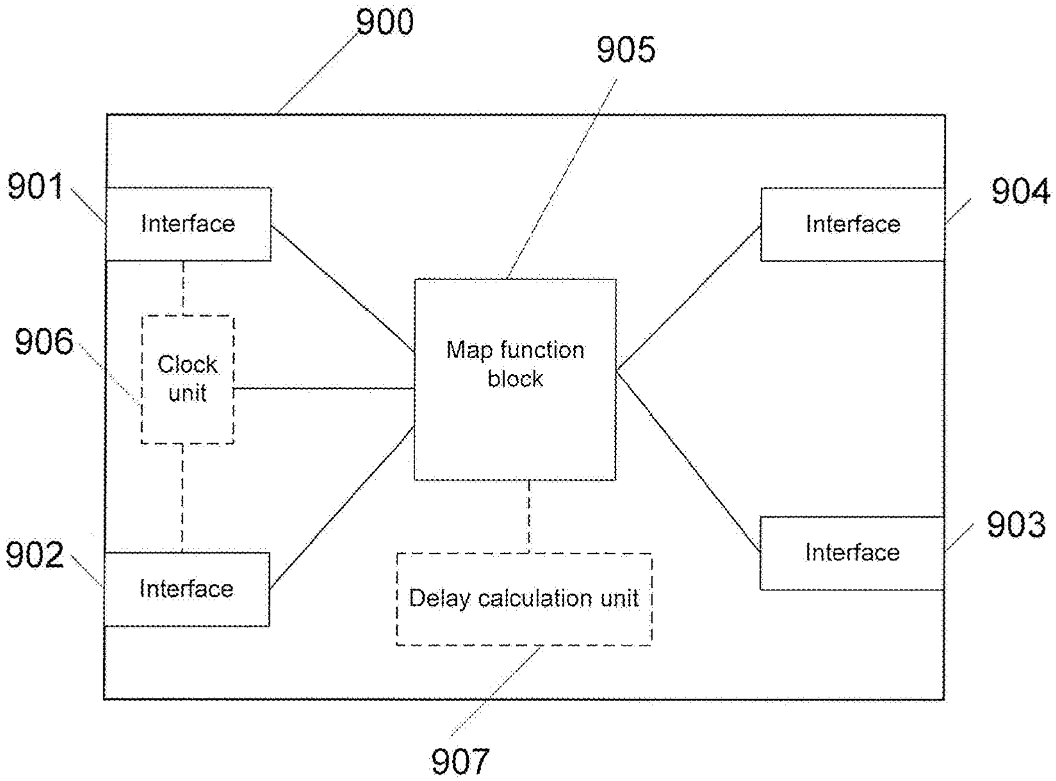
FIG. 9 is a block diagram illustrating one embodiment of rate match device according to embodiments.

FIG. 9 shows the schematic structure for one example of RMB 300. As showed in FIG. 9, RMB includes interface 901, 902, 903 and 904. Any of these interfaces can be used for transmitting data to REC or RE, or receiving data from REC or RE. Of course, if needed, some of these interfaces can be designed to only transmit data to or receive data from REC, and the other interfaces can be designed to only transmit data to or receive data from RE. We can call the interface(s) transmitting or receiving data between REC and RMB as first interface(s), and call the interface(s) transmitting or receiving data between RMB and RE as second interface(s). Data here can be user data or control information. It should be noted that the number of interfaces of RMB is not limited to four. It can be three, five or more.

As showed in FIG. 9, RMB 300 also includes a map function block 905, which is arranged to map data between one or more first interfaces and one or more second interfaces. In the downlink, map function block 905 maps data from one or more first interfaces into one or more second interfaces, and in the uplink, it maps data from one or more second interfaces into one or more first interfaces. For example, in the uplink, the map function block 905 is arranged to merge the user data received from interfaces 901 and 902 into one and then transmit it via interface 903 or 904. It should be noted that map function block 905 can be arranged to map control information from one or more first interfaces into one or more second interfaces. More specifically, the map function block 905 can comprises a first transceiver, a second transceiver and a process unit. The first transceiver is arranged to receive user data or control information from one or more first interfaces, and send user data or control information to one or more first interfaces. The second transceiver is arranged to receive user data or control information from one or more second interfaces, and send user data or control information to one or more second interfaces. The process unit is used to distribute or merge user data or control information from one or more first interfaces into one or more second interfaces. For example, the process unit distribute user data from one first interface into two second interface, from two first interface into one second interface, or from more than one first interfaces into more than one second interfaces.

For meet the requirements of RE timing in some situations, RMB 300 may include a clock unit 906, which is arranged to generate a system clock signal for RMB and a reference clock signal such as a Phase-Locked Loop clock signal for RE, based on a clock signal coming from anyone of first interfaces, such as interface 901 or 902. For example, the clock unit 906 can recover reference clock from first interface, and then generate a system clock of RMB and a reference clock such as Phase-Locked Loop clock for the second interface.

For more precise delay calculation, RMB 300 may include a delay calculation unit 907, which is arranged to calculate a delay inside of RMB itself, and this delay is used to get the link delay compensation between REC and RE. For example, the delay calculation unit 907 can calculate the downlink delay from first interface to second interface via map function block, calculate the uplink delay from second interface to first interface via map function block, and then report the downlink and uplink delay value to REC as one input parameter of REC. Then REC updates its delay compensation value with this input parameter.

It should be noted that although only downlink transmissions are described in some embodiments, the person skilled in the art can easily get the process for uplink transmissions based on these embodiments.

Embodiments of this invention can be applied to different wireless systems including REC and RE, such as WCDMA, TD-SCDMA and LTE. It should be noted that REC and RE may have different names in different systems. For example, REC may be called as Bandwidth Based Unit (BBU), and RE may be called as Remote Radio Unit (RRU).

According to embodiments of this invention, by mapping data from one or more first interfaces into one or more second interfaces, MB matches different line bit rates between REC(s) and RE(s), so REC and RE can word under their highest processing capability, or at least one of REC and RE can work with the line bit rate greater than the lower line bit rate of REC and RE, and thus the efficiency of the radio access network system is improved and the cost is saved.

It should be noted that the aforesaid embodiments are illustrative of this invention instead of restricting this invention, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. In the unit claims that list several means, several ones among these means can be specifically embodied in the same hardware item. The use of such words as first, second third does not represent any order, which can be simply explained as names.

In another embodiment, a computer program product is provided. The computer program product comprises at least one computer readable storage medium having a computer readable program instruction portion stored thereon, and the computer readable program instruction portion comprises instruction for performing any one of the methods in the embodiments above. For example, the instruction is used to receive user data from REC via one or more first interfaces of RMB, to map the user data from one or more first interfaces into one or more second interfaces of RMB, and transmit the user data to RE via one or more second interfaces.

While the forgoing disclosure shows illustrative embodiments of this invention, it should be noted that various changes and modification, such as the change of names for some nodes, could be made herein without departing from the scope of the invention as defined by claims.

What is claimed is:

1. A rate matching device used for exchanging user data between one radio equipment control node (REC) and at least one radio equipment node (RE), the rate matching device comprising:

at least one first interface configured to exchange user data between the REC and the rate matching device;

at least one second interface configured to exchange user data between the rate matching device and the at least one RE;

a map function block circuit configured to map the user data between the at least one first interface and the at least one second interface, wherein a sum rate at which user data is transmitted via the at least one second interface matches a sum rate at which the user data is received via the at least one first interface; and wherein the rate matching device is configured to determine a number of the first interfaces and a number of the second interfaces based on a relationship of line bit rates between the REC and the at least one RE.

2. The rate matching device of claim 1, wherein the map function block circuit is configured to perform at least one of the following:

distribute the user data from one first interface into two or more of the second interfaces;

merge the user data from two or more of the first interfaces into one of the second interface.

3. The rate matching device of claim 1, wherein the rate matching device is configured to determine the number of the first interfaces and the number of the second interfaces based on the following relationship:

both a sum of line bit rates of all the first interfaces and a sum of line bit rates of all the second interfaces are not greater than a largest line bit rate between the REC and the at least one RE.

4. The rate matching device of claim 1, wherein the device further comprises a clock circuit configured to generate, based on a clock signal coming from any one of the first interfaces, both:

a system clock signal for the rate matching device; and a reference clock signal for the at least one RE.

5. The rate matching device of claim 1, wherein the rate matching device further comprises a delay calculation circuit configured to calculate a delay for use in link delay compensation between the REC and the at least one RE.

6. The rate matching device of claim 1:

wherein the first interfaces and the second interfaces are further configured to transfer control information;

wherein the control information includes one or more control words indicating the way of transferring the control information.

7. A method for exchanging user data between one radio equipment control node (REC) and at least one radio equipment node (RE) through a rate matching device (RMB), the method comprising:

receiving user data from the REC via at least one first interface of the RMB;

mapping the user data from the first interface into at least one second interface of the RMB;

transmitting the user data to the at least one RE via the at least one second interface, wherein a sum rate at which user data is transmitted via the at least one second interface matches a sum rate at which the user data is received via the at least one first interface; and wherein a number of the first interfaces and a number of the second interfaces are determined based on a relationship of line bit rates between the REC and the at least one RE.

8. The method of claim 7, wherein mapping the user data from the at least one first interface into the at least one second interface comprises one of:

distributing the user data from one of the at least one first interface into two or more second interfaces;

merging the user data from two or more of the first interfaces into one second interface.

9. The method of claim 7, wherein the number of the first interfaces and the number of the second interfaces are determined based on the following relationship:

both a sum of line bit rates of all the first interfaces and a sum of line bit rates of all the second interfaces are not greater than a largest line bit rate between the REC and the at least one RE.

10. The method of claim 7, further comprising:

transferring control information from the REC to the at least one RE through the RMB;

wherein the control information includes one or more control words indicating a way of transferring the control information.

11. The method of claim 10, wherein the transferring the control information between the REC and the RMB comprises one of the following:

transmitting the control information via at least two first interfaces, with each of the at least two first interfaces carrying the same control information;

transmitting the control information via one first interface; and distributing the control information into two or more of the first interfaces.

12. The method of claim 10, wherein the transferring the control information between the RMB and the at least one RE comprises one of the following:

transmitting the control information via two or more of the second interfaces, with each of the at least two second interfaces carrying the same control information;

transmitting the control information via one of the second interfaces; and distributing the control information into two or more of the second interfaces.

13. The rate matching device of claim 1, wherein one or more of the at least one first interface is configured to receive user data at a first rate;

wherein one or more of the at least one second interface is configured to transmit user data at a second rate that is different than the first rate; and wherein the map function block circuit compensates for differences in the first and second rate.

14. The rate matching device of claim 13, wherein the map function block circuit is configured to compensate for differences in the first and the second rates by determining a number of first interfaces and a number of second interfaces that support an exchange of data between the RE and REC at the maximum of the first and second rates.

15. The rate matching device of claim 1, wherein the rate matching device transmits user data from the REC to the RE and transmits user data from the RE to the REC and the map function block circuit is configured to map any first interface to any second interface irrespective of the direction of the flow of user data transmitted and received by the rate matching device.

16. The method of claim 7, wherein transmitting the user data to the at least one RE comprises transmitting the user data to a plurality of REs via a plurality of second interfaces, and wherein the rate of receiving user data matches the rate of transmitting to each of the plurality of REs.

* * * * *